(12) United States Patent
Kim et al.

(10) Patent No.: US 9,401,803 B2
(45) Date of Patent: Jul. 26, 2016

(54) FLEXIBLE SCRAMBLER/DESCRAMBLER ARCHITECTURE FOR A TRANSCEIVER

(71) Applicant: Texas Instruments Incorporated, Dallas, TX (US)

(72) Inventors: Seuk B. Kim, Plano, TX (US); Tpinn R. Koh, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/660,825

(22) Filed: Oct. 25, 2012

(65) Prior Publication Data

US 2014/0119413 A1  May 1, 2014

(51) Int. Cl.
H04L 29/06 (2006.01)
H04L 9/06 (2006.01)

(52) U.S. Cl.
CPC .................................... H04L 9/065 (2013.01)

(58) Field of Classification Search
CPC ...................................................... H04L 9/065
See application file for complete search history.

(56) References Cited

U.S. PATENT DOCUMENTS

| | | | |
|---|---|---|---|
| 4,744,104 A | 5/1988 | Popischil | |
| 5,199,072 A * | 3/1993 | White et al. | 380/44 |
| 5,267,316 A | 11/1993 | Gonzalez et al. | |
| 6,167,515 A | 12/2000 | Lin | |
| 6,820,230 B2 | 11/2004 | Sweeney | |
| 6,907,062 B2 | 6/2005 | Carlson | |
| 7,124,158 B2 | 10/2006 | Ruthstein et al. | |
| 7,414,112 B2 | 8/2008 | Grimaldi et al. | |
| 7,486,725 B2 | 2/2009 | Chen et al. | |
| 7,505,589 B2 | 3/2009 | Lablans | |
| 2003/0014451 A1 | 1/2003 | Peyser et al. | |
| 2003/0133568 A1* | 7/2003 | Stein et al. | 380/37 |
| 2007/0008997 A1 | 1/2007 | Mochizuki et al. | |
| 2007/0098160 A1 | 5/2007 | Lablans | |
| 2009/0010362 A1 | 1/2009 | Thaler | |
| 2009/0092246 A1* | 4/2009 | Fujisaki et al. | 380/28 |
| 2009/0161439 A1* | 6/2009 | Aiika et al. | 365/185.23 |
| 2010/0070822 A1 | 3/2010 | Leung et al. | |
| 2010/0095185 A1* | 4/2010 | Ganga et al. | 714/758 |

FOREIGN PATENT DOCUMENTS

RU        2292644        1/2007

OTHER PUBLICATIONS

Schneier, Bruce. Applied Cryptography. 1996. John Wiley & Sons, Inc. Second edition. 198-199.*
IEEE Standard 802.3-2008.
Advanced Encryption Standard (AES), Federal Information Processing Standards Publication 197, Nov. 26, 2001.
Szczepanek et al., 10GBASE-KR FEC Tutorial, IEEE802 Plenary Jul. 2006.

* cited by examiner

*Primary Examiner* — Fatoumata Traore
*Assistant Examiner* — Kendall Dolly
(74) *Attorney, Agent, or Firm* — Andrew Viger; Frank D. Cimino (57) ABSTRACT

An apparatus is provided. A polynomial register having a plurality of bits is provided, where the polynomial register is configured to store a user-defined polynomial. A transceiver is coupled to a first bus, a second bus, and the polynomial register. The transceiver includes a self-synchronous scrambler that is configured to generate a scrambled signal from a first signal using the user-defined polynomial and a self-synchronous descrambler that is configured to generate a descrambled signal from a second signal using the user-defined polynomial.

12 Claims, 4 Drawing Sheets

FLEXIBLE SCRAMBLER/DESCRAMBLER ARCHITECTURE FOR A TRANSCEIVER

TECHNICAL FIELD

The invention relates generally to a transceiver and, more particularly, to a physical transceiver (PHY) having a flexible architecture.

BACKGROUND

Figure 1:
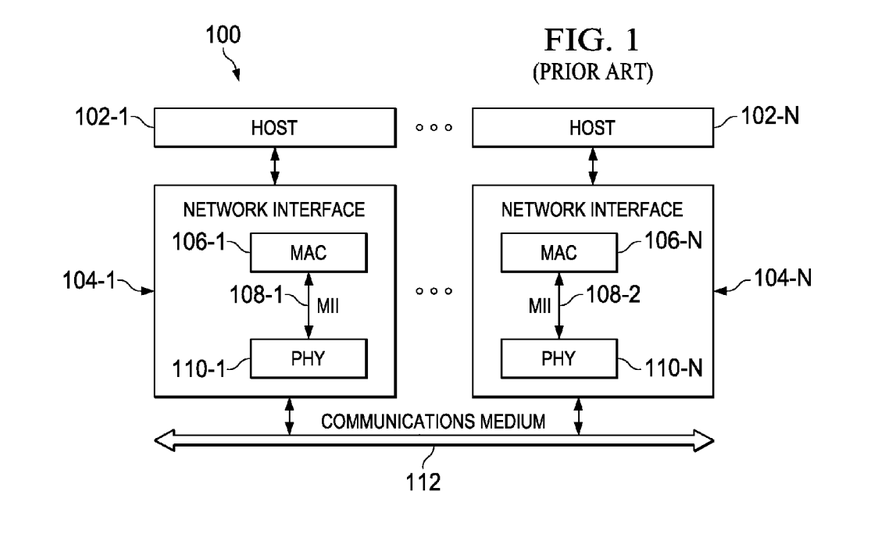
FIG. 1 is a diagram of an example of a conventional system.

Turning to FIG. 1, an example of a conventional system 100 can be seen. In this system 100, hosts 102-1 to 102-N (which can be; for example, a computer, router, or switch) are able to communicate with one another over communications medium 112 (which can; for example, be an optical fiber, backplane, or twisted pair) through network interfaces 104-1 to 104-N. In this example, the network interfaces 104-1 to 104-N employ Ethernet over Electrical Backplanes and, more specifically, 10 GBase-KR. A description of 10 GBase-KR can be found in the Institute of Electrical and Electronics Engineers (IEEE) standard 802.3-2008 (which is dated Dec. 26, 2008 and which is incorporated by reference herein for all purposes). These network interfaces 104-1 to 104-N employ media access control (MAC) circuits 106-1 to 106-N that communicate with PHYs 110-1 to 110-N, via media independent interfaces (MIIs) 108-1 to 108-N (which can typically have half-duplex or full-duplex operation), each of which is described in IEEE standard 802.3-2008.

Figure 2:
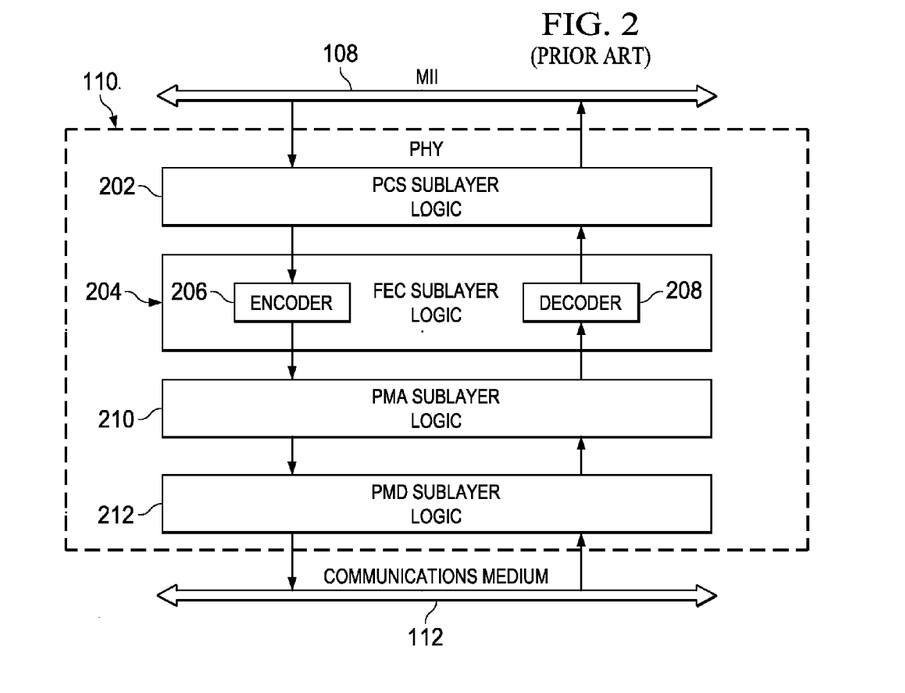
FIG. 2 is a diagram of an example of a PHY of FIG. 1.

Of interest here, however, are PHYs 110-1 to 110-N, and, as can be seen in greater detail in FIG. 2, PHYs 110-1 to 110-N (hereinafter PHY 110), PHY 110 employs several sublayers. This PHY 110 can be an independent integrated circuit (IC) or can be integrated with a MAC circuit (i.e., MAC circuit 106-1) and an MII 108. As shown, the PHY 110 is generally comprised of physical medium dependent (PMD) sublayer logic 212; physical medium attachment (PMA) sublayer logic 210, forward error correction (FEC) sublayer logic 204, and physical coding (PCS) sublayer logic 202. These sublayer logic circuits 202, 204, 210, and 212 interact with one another to provide communications between MII 108 and communications medium 112. For transmission, the FEC sublayer logic 204 employs an encoder 206 as described in IEEE standard 802.3-2008, clause 74, and, for reception, the FEC sublayer logic 204 employs a decoder 308 as described in IEEE standard 802.3-2008, clause 74.

Figure 3:
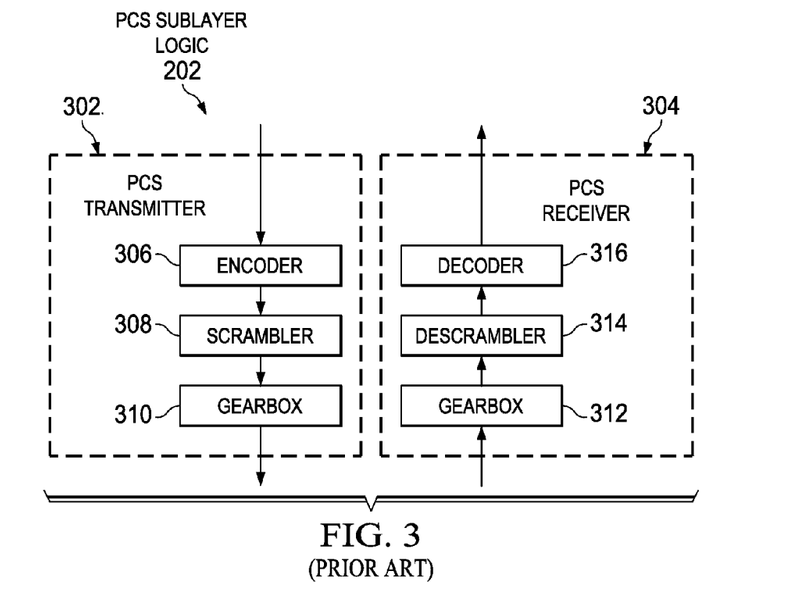
FIG. 3 is a diagram of a PCS sublayer logic of FIG. 2.

As can be seen in FIG. 3, the PCS sublayer logic 202 can be a transceiver, having a PCS transmitter 302 and a PCS receiver 304. The transmitter 302, in this example, is able to receive data from MII 108, encode the data with encoder 306, scramble the encoded data with scrambler 308, and convert (so as to be used by FEC sublayer logic 204) with gearbox 310. The receiver 304, in this example, is able to convert data from FEC sublayer logic 204 using gearbox 312, descramble the data with descrambler 314, and decode the data (for use with MII 108) with decoder 316. The details of PCS sublayer logic 202 can, for example, be seen in IEEE standard 802.3-2008, clauses 48 and 74.

Of interest here are the scrambler 308 and descrambler 314. In this example, the scrambler 308 and descrambler 314 are able to perform data scrambling/descrambling and error checking. One purpose in scrambling/descrambling data with the PHYs 110-1 to 110-N is to substantially randomize the data to reduce the impact of electromagnetic interference (EMI) and improve signal integrity. This is typically accomplished by the use of a pseudorandom bit sequence (PRBS) generated with a specified polynomial. For example, for 8b/10b encoding, a PRBS-7 (or $1+x^6+x^7$) can be employed, and, for synchronous optical networking or SONET (as specified in ITU O.150), PRBS-23 (or $X^{23}+X^{18}+1$). Similarly, this PRBS signaling can be employed for error checking.

However, as demonstrated above, one polynomial is generally not applicable to all standards (e.g., 802.3-2008 and SONET); each standard usually specifies its own polynomial. Conventionally, this meant that each PHY (e.g., 110-1) would be designed for a particular standard (e.g., PRBS-7 for 802.3-2008) and would lack the flexibility to be used with other standards. A reason for this is that the serial and parallel implementations for the PHYs (e.g., 110-1) would be too costly in terms of area, price, and power consumption to be generally applicable.

Therefore, there is a need for a flexible transceiver architecture.

Some examples of conventional systems are: U.S. Pat. No. 4,744,104; U.S. Pat. No. 5,267,316; U.S. Pat. No. 6,820,230; U.S. Pat. No. 6,907,062; U.S. Pat. No. 7,124,158; U.S. Pat. No. 7,414,112; U.S. Pat. No. 7,486,725; U.S. Pat. No. 7,505,589; U.S. Patent Pre-Grant Publ. No. 2003/0014451; U.S. Patent Pre-Grant Publ. No. 2007/008997; and U.S. Patent Pre-Grant Publ. No. 2007/0098160.

SUMMARY

In accordance with an embodiment of the present invention, an apparatus is provided. The apparatus comprises a polynomial register having a plurality of bits, wherein the polynomial register is configured to store a user-defined polynomial; a first bus; a second bus; and a transceiver that is coupled to the first bus, the second bus, and the polynomial register, wherein the transceiver includes: a self-synchronous scrambler that is configured to generate a scrambled signal from a first signal using the user-defined polynomial; and a self-synchronous descrambler that is configured to generate a descrambled signal from a second signal using the user-defined polynomial.

In accordance with an embodiment of the present invention, the first bus further comprises a first input bus and a second input bus, and wherein the second bus further comprises a first output bus and a second output bus, and wherein the transceiver further comprises: a transmitter having an encoder that is coupled to the first input bus and the self-synchronous scrambler, wherein the self-synchronous scrambler is coupled of the first output bus; and a receiver having a decoder that is coupled to the second output bus and the self-synchronous descrambler, wherein the self-synchronous descrambler is coupled to the second input bus.

In accordance with an embodiment of the present invention, the first input bus has a programmable width.

In accordance with an embodiment of the present invention, each of the self-synchronous scrambler and self-synchronous descrambler further comprises: a first matrix circuit that is configured to include a first matrix corresponding to the user-defined polynomial; a second matrix circuit that is configured to include a first matrix corresponding to the user-defined polynomial; a first multiplier that is coupled to the second matrix circuit and that is coupled to the respective one of the encoder and the second input bus; a data register; a second multiplier that is coupled to the first matrix circuit and the data register; and an XOR circuit that is coupled to the first and second multipliers and that is coupled to the respective one of the first output bus and the decoder.

In accordance with an embodiment of the present invention, the data register of the self-synchronous scrambler is coupled to the encoder, and wherein the data register of the self-synchronous descrambler is coupled to the second input bus.

In accordance with an embodiment of the present invention, the polynomial register has 32 bits.

In accordance with an embodiment of the present invention, a method is provided. The method comprises retrieving a user-defined polynomial from a polynomial register having a plurality of bits; generating first and second matrices based at least in part on the user-defined polynomial; multiplying the first matrix by a first data set to generate a second data set; retrieving a third data set from a data register; multiplying the third data set by the second matrix to generate a fourth data set; XORing the second and fourth data sets to generate a fifth data set; and outputting the fifth data set.

In accordance with an embodiment of the present invention, the method further comprises loading the fifth data set into the data register to form the third data set.

In accordance with an embodiment of the present invention, the step of outputting further comprises outputting the fifth data set over a bus.

In accordance with an embodiment of the present invention, the method further comprises loading the first data set into the data register to form the third data set.

In accordance with an embodiment of the present invention, an apparatus is provided. The apparatus comprises a media access control (MAC) circuit; a interface that is coupled to the MAC circuit; a physical transceiver (PHY) having: physical coding sublayer (PCS) logic having: a polynomial register having a plurality of bits, wherein the polynomial register is configured to store a user-defined polynomial; a bus that is coupled to the interface; an encoder that is coupled to the first bus; a self-synchronous scrambler that is coupled to the encoder and the first output bus, wherein that is configured to generate a scrambled signal from a first signal using the user-defined polynomial; a decoder that is coupled to the bus; and a self-synchronous descrambler that is configured to generate a descrambled signal from a second signal using the user-defined polynomial; forward error correction (FEC) logic that is coupled to the PCS logic; physical medium attachment (PMA) logic that is coupled to the FEC logic; and physical dependent medium (PMD) logic that is coupled to the PMA logic.

In accordance with an embodiment of the present invention, the PCS logic further comprises: a first gearbox that is coupled between the self-synchronous scrambler and the FEC logic; and a second gearbox that is coupled between the self-synchronous descrambler and the FEC logic.

In accordance with an embodiment of the present invention, the bus has a programmable width.

In accordance with an embodiment of the present invention, the each of the self-synchronous scrambler and self-synchronous descrambler further comprises: a first matrix circuit that is configured to include a first matrix corresponding to the user-defined polynomial; a second matrix circuit that is configured to include a first matrix corresponding to the user-defined polynomial; a first multiplier that is coupled to the second matrix circuit and that is coupled to the respective one of the encoder and the second input bus; a data register; a second multiplier that is coupled to the first matrix circuit and the data register; and an XOR circuit that is coupled to the first and second multipliers.

In accordance with an embodiment of the present invention, the apparatus further comprises: a host that is coupled to the MAC circuit; and a communications medium that is coupled to the PHY.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 4:
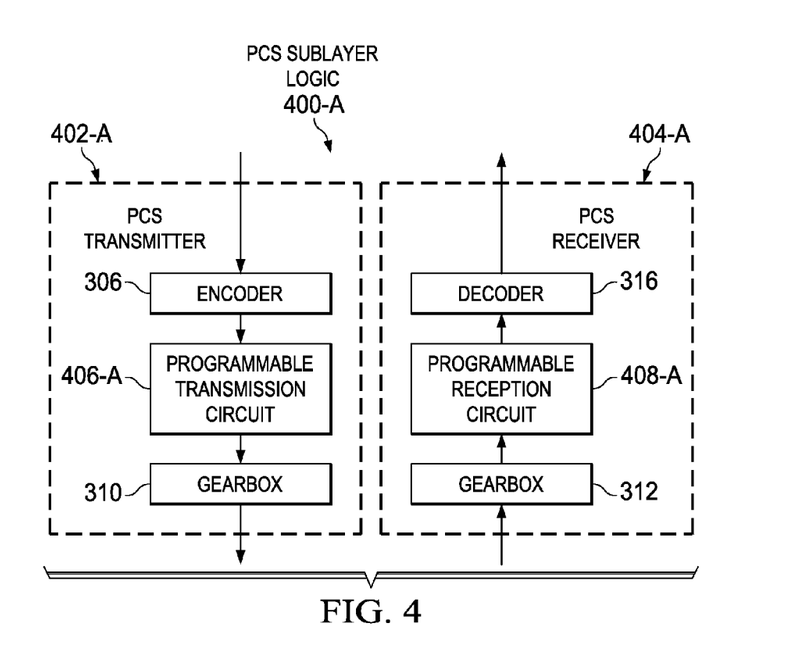
FIGS. 4 and 5 are diagrams of an example of a PCS sublayer logic in accordance with embodiments of the present invention.
Figure 5:
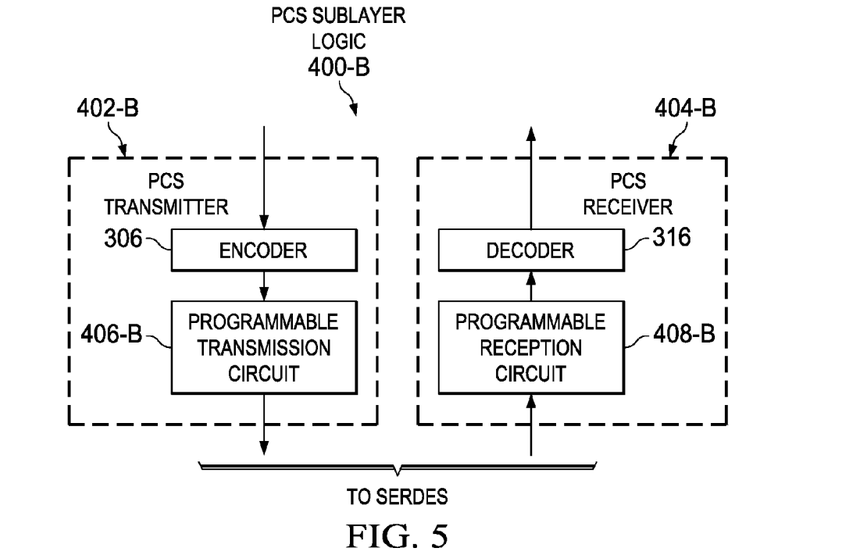

Turning to FIGS. 4 and 5, example of the transceivers 400-A and 400-B can be seen. As shown with the example shown in FIG. 4, transceiver 400-A can be used as part of PCS sublayer logic 202 of FIG. 3, and, as shown in the example of FIG. 5, transceiver 400-B can be used to communicate with a serializer/deserializer (SERDES) device. Other implementations can be used with the transceivers 400-A and 400-B, including implementations that omit encoder 306 and decoder 316. In each case, the transceivers 400-A and 400-B employ programmable transmission and reception circuits 406-A/406-B and 408-A/408-B that can perform scrambling/descrambling and error checking based on a user-specified or user-defined polynomial.

Figure 6:
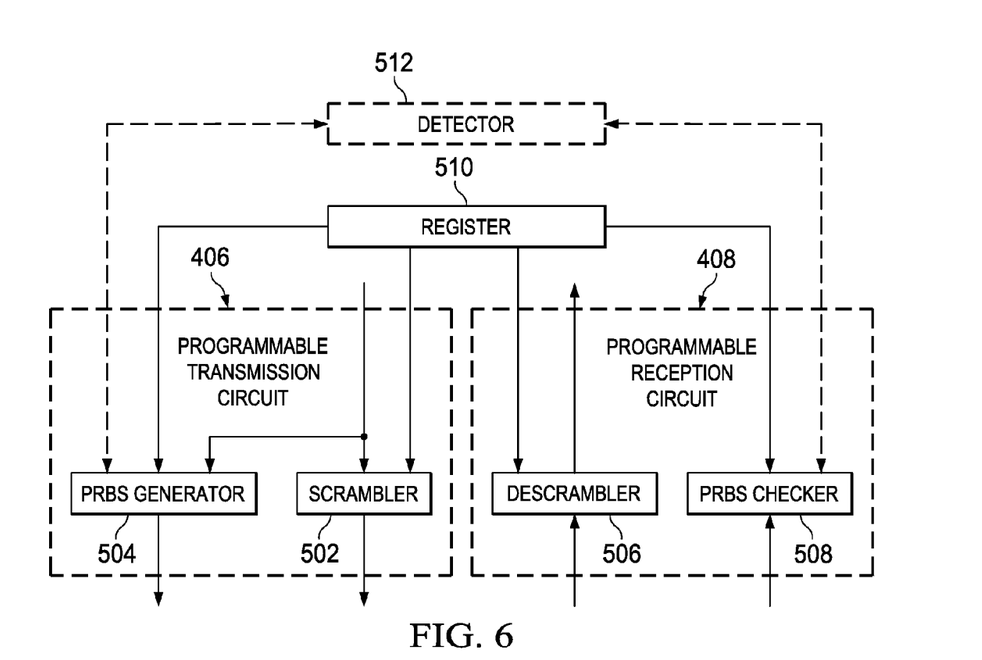
FIG. 6 is a diagram of an example of the programmable transmission and reception circuits of FIGS. 4 and 5.

Turning to FIG. 6, the programmable transmission and reception circuits 406-A/406-B and 408-A/408-B (which are referred to hereinafter as 406 and 408) can be seen in greater detail. Collectively, circuits 406 and 408 can be considered to be a transceiver. As shown in this example, circuit 406 generally comprises a PRBS generator 504 and a scrambler 502, while circuit 408 generally comprises a descrambler 506 and PRBS checker 508. As shown, there can also be a detector 510 that is in communication with the PRBS generator 504 and 508. This detector 512 can cause the PRBS generator 504 to transmit PRBS data sets over a communications medium (e.g., 112) and receive the bit errors from the PRBS checker 508. Based on this information, the detector 512 can search for optimal settings by transmitting repeated PRBS data sets (after each adjustment iteration) and receiving the bit errors, or it can characterize the communication channel (e.g., 114), allowing the detector 512 to detect the communication medium type (e.g., twist pair, optical, and so forth). Additionally, the busses that communicate with the scrambler 502 and descrambler 506 can have a programmable width (e.g., a maximum width of 32 bits but adjustable down to 1 bit).

Also, as can be seen in the example of FIG. 6, there is a polynomial register 510 shown. This polynomial register 601 typically has a predetermined width or number of bits (e.g., 32 bit) that is accessible to a user. The user is able to write to this register 601 so as to store a user-defined polynomial. As an example, if a user chooses to use PRBS-7 (which has a polynomial of $1+x^6+x^7$) for scrambler 502, the user can write the following to a 32-bit register (e.g., register 601):

$$0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 1\ 1\ 0\ 0\ 0\ 0\ 0\ 1$$

Thus, for an example register (e.g., 601) having a width of 32 bits, the user can specify any of approximately $2 \times 10^9$ polynomials. This user-defined polynomial (which can be retrieved from register 601) can be used by the scrambler 502, PRBS generator 504, descrambler 506, and PRBS checker 508 accordingly. Alternatively, there can be multiple polynomial registers (e.g. 510), and each of the scrambler 502, PRBS generator 504, descrambler 506, and PRBS checker 508 may have a separate polynomial register (e.g., 510).

Figure 7:
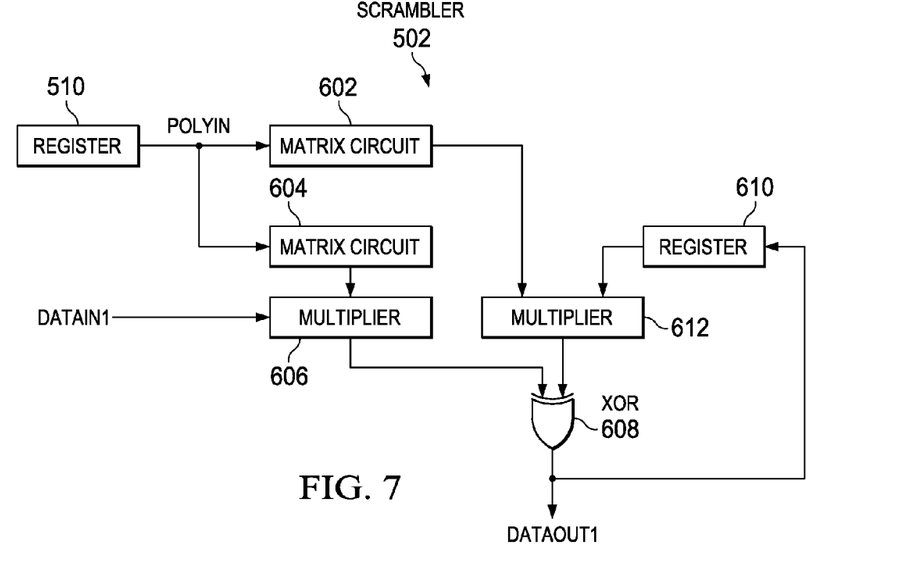
FIG. 7 is a diagram of an example of the scrambler of FIG. 6.

Turning to FIG. 7, an example of the scrambler 502 can be seen in greater detail. In operation, the signal POLY (which generally corresponds to the user-defined polynomial stored in register 510) can be used by the matrix circuits 602 and 604 to generate matrices, which can be referred to a polynomial state matrix (or P-matrix) and a data matrix or (D-matrix) respectively. The P- and D-matrices $\underline{P}$ and $\underline{D}$ are typically square binary matrices that are a function of or based at least in part on the user-defined polynomial. The basis for forming the P- and D-matrices $\underline{P}$ and $\underline{D}$ are identity matrices $\underline{I_P}$ and $\underline{I_D}$ (respectively), which typically have uniquely assigned vectors for each column of the first row of the P- and D-matrices $\underline{P}$ and $\underline{D}$ (i.e., $P_{0,j}$ and $D_{0,j}$). An example of identity matrix $\underline{I_P}$ can be seen below:

$$\begin{bmatrix}
1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1
\end{bmatrix}$$

The identity matrix $\underline{I_D}$ is generally comprised of the matrix $\underline{I_P}$ that is shifted or adjusted based on the desired input bus width. For example, the identity matrix $\underline{I_D}$ (which is derived from the matrix $\underline{I_P}$ shown above) can be as follows for a 20-bit bus width:

$$\begin{bmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1
\end{bmatrix}$$

An adjustment vector $\vec{A}$ is also determined. Typically, when the signal POLY1 is transmitted, the lowest bit is truncated, and a '0' is appended to signal POLY1 to form adjustment vector $\vec{A}$. For example, with the PRBS-7 polynomial used above, the adjustment vector $\vec{A}$ would be:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 0 |

The P- and D-matrices $\underline{P}$ and $\underline{D}$ can then be determined.

Looking first to the P-matrix $\underline{P}$, it can be determined on a row-by-row basis through the use of a set of matrices (e.g., 32-32×32 matrices), which can be referred to a working matrices $\underline{WP[r]}$, where r denote the P-matrix $\underline{P}$ row. These working matrices $\underline{WP[r]}$, in this example, are based at least in part on the identity matrix $\underline{I_P}$ and can be determined using the following formula:

$$\underline{WP[r]} = \begin{cases} \underline{WP[0]} = \underline{I_P} \\ WP_{i,j}[r] = WP_{i-1,j-1}[r],\ 1 \leq r,\ i \leq n;\ 2 \leq j \leq n \\ WP_{i,0}[r] = FNP[r],\ 1 \leq r \leq n \end{cases} \quad (1)$$

where $$FNP[r] = \left(\overrightarrow{WP_j[r-1]} \oplus \vec{A}\right) \bullet \ldots \bullet \left(\overrightarrow{WP_0[r-1]} \oplus \vec{A}\right) \quad (2)$$

The P-matrix $\underline{P}$ can then be extracted from working matrices $\underline{WP[r]}$ by application of the following equation:

$$P_{i,j} = \begin{cases} 0, & i > BW \\ WP_{i,j}[BW-1], & \text{otherwise} \end{cases} \quad (3)$$

where BW is the bus width. For example, with the PRBS-7 polynomial used above and a 20-bit bus width BW, the P-matrix $\underline{P}$ should be:

$$\begin{bmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & WD_1[r] \oplus \vec{A} & 0 & 0 & 0 & WD_0[r] \oplus \vec{A} & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 0 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 0 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 0 & 0 & 1 & 1 & 1 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 1 & 0 & 0 & 1 & 1 \\
\end{bmatrix}$$

Similarly, with D-matrix $\underline{D}$, it can be determined on a row-by-row basis through the use of a set of matrices (e.g., 32-32×32 matrices) or working matrices $\underline{WD[r]}$. These working matrices $\underline{WD[r]}$, in this example, are based at least in part on the identity matrix $\underline{I_D}$ and can be determined using the following formula:

$$\underline{WD[r]} = \begin{cases} \underline{WD[0]} = \underline{I_D} \\ WD_{i,j}[r] = WD_{i-1,j-1}[r], \; 1 \le r, \; i \le n; \; 2 \le j \le n \\ WD_{i,0}[r] = FND[r], \; 1 \le r \le n \end{cases} \quad (4)$$

where $$FND[r] = (\overrightarrow{WD_j[r-1]} \oplus \vec{A}) \bullet \ldots \bullet (\overrightarrow{WD_0[r-1]} \oplus \vec{A}) \quad (5)$$

The D-matrix $\underline{D}$ can then be extracted from working matrices $\underline{WD[r]}$ by application of the following equation:

$$D_{i,j} = \begin{cases} 0, & i > BW \\ WD_{i,j}[BW-1], & \text{otherwise} \end{cases} \quad (6)$$

Once the P- and D-matrices $\underline{P}$ and $\underline{D}$ have been generated by matrix circuits 602 and 604, respectively, the input data DATAIN1 for scrambler 502. The multiplier 606 can multiply the input data DATAIN1 (which can for example be 20-bits wide data vector) by the D-matrix $\underline{D}$. The P-matrix $\underline{P}$ can be multiplied by the information (e.g., vector) stored in register 610 with multiplier 612. The outputs of multipliers 606 and 612 can then be XORed with circuit 608, written to register 610, and output (e.g., as an output data vector DATAOUT1). Thus, the scrambler 502 can function as a self-synchronous scrambler or parallel multiplicative scrambler that uses a user-defined polynomial so as to allow the scrambler 502 to be compliant with a wide variety of standards (e.g., communication protocols).

Figure 8:
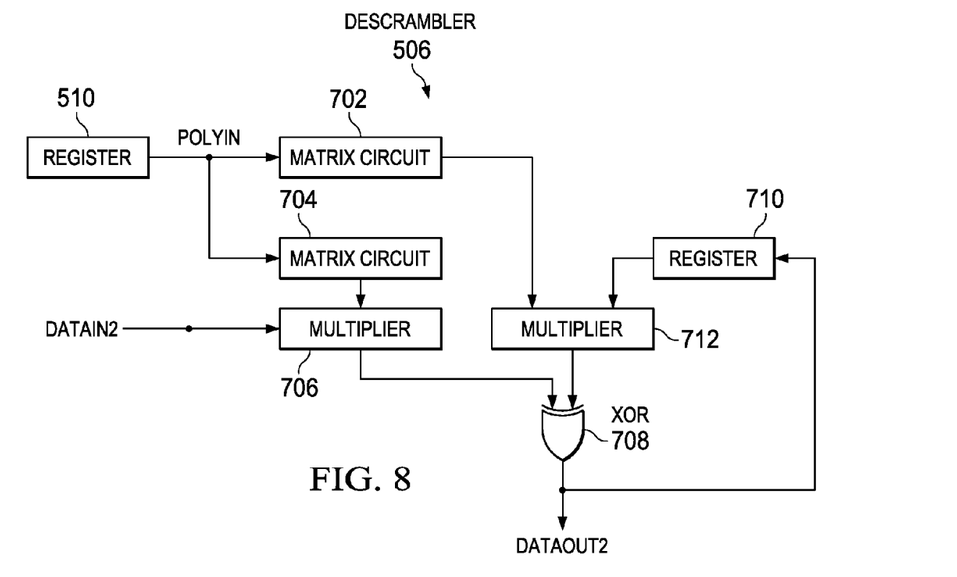
FIG. 8 is a diagram of an example of the descrambler of FIG. 6.

As can be seen in FIG. 8, the descrambler 506 operates in a similar matter to that of scrambler 502. Matrix circuits 702 and 704 can compute the P- and D-matrices $\underline{P}$ and $\underline{D}$ in a similar manner to that described above with respect to matrix circuits 602 and 604, and multipliers 706 and 712, register 710, and XOR circuit 708 can perform the same general functions as multipliers 606 and 612, register 610, and XOR circuit 608 in scrambler 502. One difference is that each cycle (for example), the input data vector DATAIN2 is written to register 710 instead of the data output vector DATAOUT2 (which would correspond to the operation of scrambler 502). As with the scrambler 502, descrambler 506 can function as a self-synchronous descrambler or parallel multiplicative descrambler that uses a user-defined polynomial so as to allow the descrambler 502 to be compliant with a wide variety of standards (e.g., communication protocols).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first bus;
   a second bus; and
   a transceiver interfaced to the first and second buses, and including
   a polynomial register configured to store a user-defined polynomial;
   a self-synchronous scrambler that is configured to generate a scrambled DATAOUT1 signal from a DATAIN1 signal using the user-defined polynomial; and
   a self-synchronous descrambler configured to generate a descrambled DATAOUT2 signal from a DATAIN2 signal using the user-defined polynomial;
   wherein the each of the self-synchronous scrambler and self-synchronous descrambler includes a data register configured to respectively receive the DATAOUT1 signal and the DATAIN2 signal;
   a polynomial matrix circuit configured to generate a P-matrix based on the user-defined polynomial;
   a data matrix circuit configured to generate a D-matrix based on the user-defined polynomial;
   a data multiplier coupled to the data matrix circuit, and respectively coupled to receive DATAIN1 and DATAIN2;
   a polynomial multiplier coupled to the polynomial matrix circuit and the data register; and
   an XOR circuit coupled to the data and polynomial multipliers.

2. The apparatus of claim 1, wherein the polynomial register has 32 bits.

3. An apparatus comprising:
   a media access control (MAC) circuit;
   an interface coupled to the MAC circuit; and
   a physical transceiver (PHY) having:
      a polynomial register configured to store a user-defined polynomial;
      a first bus and a second bus coupled to the interface;
      a self-synchronous scrambler coupled to the first bus, and configured to generate a scrambled DATAOUT1 signal from a DATAIN1 signal using the user-defined polynomial;
      a self-synchronous descrambler coupled to the second bus, and configured to generate a descrambled DATAOUT2 signal from a DATAIN2 signal using the user-defined polynomial;
      wherein the each of the self-synchronous scrambler and self-synchronous descrambler includes:
         a data register configured to respectively receive the DATAOUT1 signal from the self-synchronous scrambler and the DATAIN2 signal from the second bus;
         a polynomial matrix circuit configured to generate a P-matrix based on the user-defined polynomial;
         a data matrix circuit configured to generate a D-matrix based on the user-defined polynomial;
         a data multiplier coupled to the data matrix circuit, and respectively coupled to receive the DATAIN1 signal from the first bus and the DATAIN2 signal from the second bus;
         a polynomial multiplier coupled to the polynomial matrix circuit and the data register; and
         an XOR circuit coupled to the data and polynomial multipliers.

4. The apparatus of claim 1,
   further comprising an encoder coupled to the first bus, and a decoder coupled to the second bus; and
   wherein the self-synchronous scrambler receives the DATAIN1 signal from the encoder; and
   wherein the self-synchronous descrambler outputs the DATAOUT2 signal to the decoder.

5. The apparatus of claim 1, wherein
   the self-synchronous scrambler receives the DATAIN1 signal with a programmable width; and
   the self-synchronous descrambler receives the DATAIN2 signal with a programmable width.

6. The apparatus of claim 1, further comprising:
   a first gearbox circuit coupled to receive the DATAOUT1 signal from the self-synchronous scrambler; and
   a second gearbox circuit coupled to provide the DATAIN2 signal to the self-synchronous descrambler.

7. The apparatus of claim 3, wherein the polynomial register has 32 bits.

8. The apparatus of claim 3, wherein the apparatus further comprises:
   a host that is coupled to the MAC circuit; and
   a communications medium that is coupled to the PHY.

9. The apparatus of claim 3, wherein the PHY further comprises an encoder coupled to the first bus, and a decoder coupled to the second bus; and
   wherein the self-synchronous scrambler receives the DATAIN1 signal from the encoder; and
   wherein the self-synchronous descrambler outputs the DATAOUT2 signal to the decoder.

10. The apparatus of claim 3, wherein
    the self-synchronous scrambler receives the DATAIN1 signal with a programmable width; and
    the self-synchronous descrambler receives the DATAIN2 signal with a programmable width.

11. The apparatus of claim 3, wherein the PHY further comprises:
    a first gearbox circuit coupled to receive the DATAOUT1 signal from the self-synchronous scrambler; and
    a second gearbox circuit coupled to provide the DATAIN2 signal to the self-synchronous descrambler.

12. The apparatus of claim 3, wherein the PHY further comprises:
    forward error correction (FEC) logic configured to receive the DATAOUT1 signal from the self-synchronous scrambler and provide the DATAIN2 signal to the self-synchronous descrambler;
    physical medium attachment (PMA) logic that is coupled to the FEC logic; and
    physical dependent medium (PMD) logic that is coupled to the PMA logic.

* * * * *